United States Patent
Erhart et al.

(10) Patent No.: US 8,238,530 B2
(45) Date of Patent: Aug. 7, 2012

(54) AUTHENTICATING A USER BASED ON THE USER'S ABILITY TO DISTINGUISH TYPE-A FROM TYPE-B SOUNDS

(75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 741 days.

(21) Appl. No.: 12/474,022

(22) Filed: May 28, 2009

(65) Prior Publication Data
US 2010/0303216 A1    Dec. 2, 2010

(51) Int. Cl.
*H04M 11/00* (2006.01)
(52) U.S. Cl. ............ 379/93.03; 379/88.02; 379/142.05; 713/182; 713/186
(58) Field of Classification Search ............... 379/88.02, 379/93.03, 142.05; 713/186, 182
See application file for complete search history.

(56) References Cited

U.S. PATENT DOCUMENTS

| | | | |
|---|---|---|---|
| 2006/0288225 A1* | 12/2006 | Jung et al. | 713/182 |
| 2010/0054429 A1* | 3/2010 | Tonini | 379/88.02 |
| 2010/0106975 A1* | 4/2010 | Vandervort | 713/186 |

* cited by examiner

*Primary Examiner* — Fan Tsang
*Assistant Examiner* — Van D Huynh (57) ABSTRACT

A method of authentication is disclosed. When a user registers with an enterprise, the enterprise instructs the user to select sounds from a selection of sounds. Any sound that the user selects is designated as a "type-A" sound and any sound that is not so designated is deemed a "type-B" sound. To authenticate the user, the enterprise combines type-A sounds and type-B sounds into a temporal series of sounds and constructs questions about the series that can only be answered by someone who can recognize and distinguish type-A sounds from type-B sounds. The series of sounds and the questions are then transmitted to the user. If the user is able to answer the questions, then he or she is authenticated, and if not, then he or she is not authenticated.

14 Claims, 6 Drawing Sheets

AUTHENTICATING A USER BASED ON THE USER'S ABILITY TO DISTINGUISH TYPE-A FROM TYPE-B SOUNDS

FIELD OF THE INVENTION

The present to telecommunications in general, and, more particularly, to telecommunications enterprises.

BACKGROUND OF THE INVENTION

When a user contacts a bank or other enterprise via the telephone, the bank might require the user to orally provide his or her password to authenticate his identity. This type of authentication is particularly vulnerable to eavesdroppers, and, therefore, the need exists for a better method of authenticating a user via telephone.

SUMMARY OF THE INVENTION

The present invention provides a method of authenticating a user via telephone in a way that avoids some of the costs and disadvantages for doing so in the prior art. When a user registers with an enterprise for the first time, the enterprise instructs the user to select one or more sounds from a selection of sounds. The selection of sounds can include anything—spoken words, music, noise, a friend or family's member's voice, etc. The user can also record and select one or more sounds.

Any sound that the user selects is designated as a "type-A" sound. Any sound that is not designated by the user as "type-A" is—automatically and by definition—designated as a "type-B" sound. There is nothing inherent in a sound that makes it either "type-A" or "type-B," and the designation of any given sound as type-A by the user should appear to an eavesdropper as arbitrary. In other words, it should be impossible—or at least improbable—for an eavesdropper to predict whether a user would designate a given sound as type-A or not.

After registration is complete and a set of type-A sounds have been designated, the user can begin to authenticate himself or herself to the enterprise by asserting his or her identity and a request for authentication. The enterprise then selects a random number of type-A sounds and a random number of type-B sounds and combines them, in random order, to form a temporal series of sounds. The enterprise also constructs a question about the series of sounds that can only be answered by someone who is able to recognize type-A sounds and distinguish them from type-B sounds. For example, the question might be "Does the series of 7 sounds contain exactly 3 type-A sounds?" or "Does the series of sounds comprise 2 type-A sounds in succession?"

The series of sounds and the question is then transmitted by the enterprise to the user via telephone. If the user is able to answer the question, then he or she is authenticated, and if the user is unable to answer the question, then he or she is not authenticated.

An advantage of the illustrative embodiment is that even if an eavesdropper hears the series of sounds, the question, and the correct answer, it can be difficult for the eavesdropper to deduce which are the type-A sounds. This makes it difficult for the eavesdropper to later impersonate the user.

The illustrative embodiment of the present invention comprises: (i) transmitting a series of $X(t_1)+Y(t_1)$ sounds to a client, wherein the series of $X(t_1)+Y(t_1)$ sounds comprises $X(t_1)$ type-A sounds and $Y(t_1)$ type-B sounds, and (ii) authenticating the client when and only when a user demonstrates an ability to distinguish a type-A sound from a type-B sound in the $X(t_1)+Y(t_1)$ sounds, wherein $X(t_1)$ and $Y(t_1)$ are positive integers.

DETAILED DESCRIPTION

Figure 1:
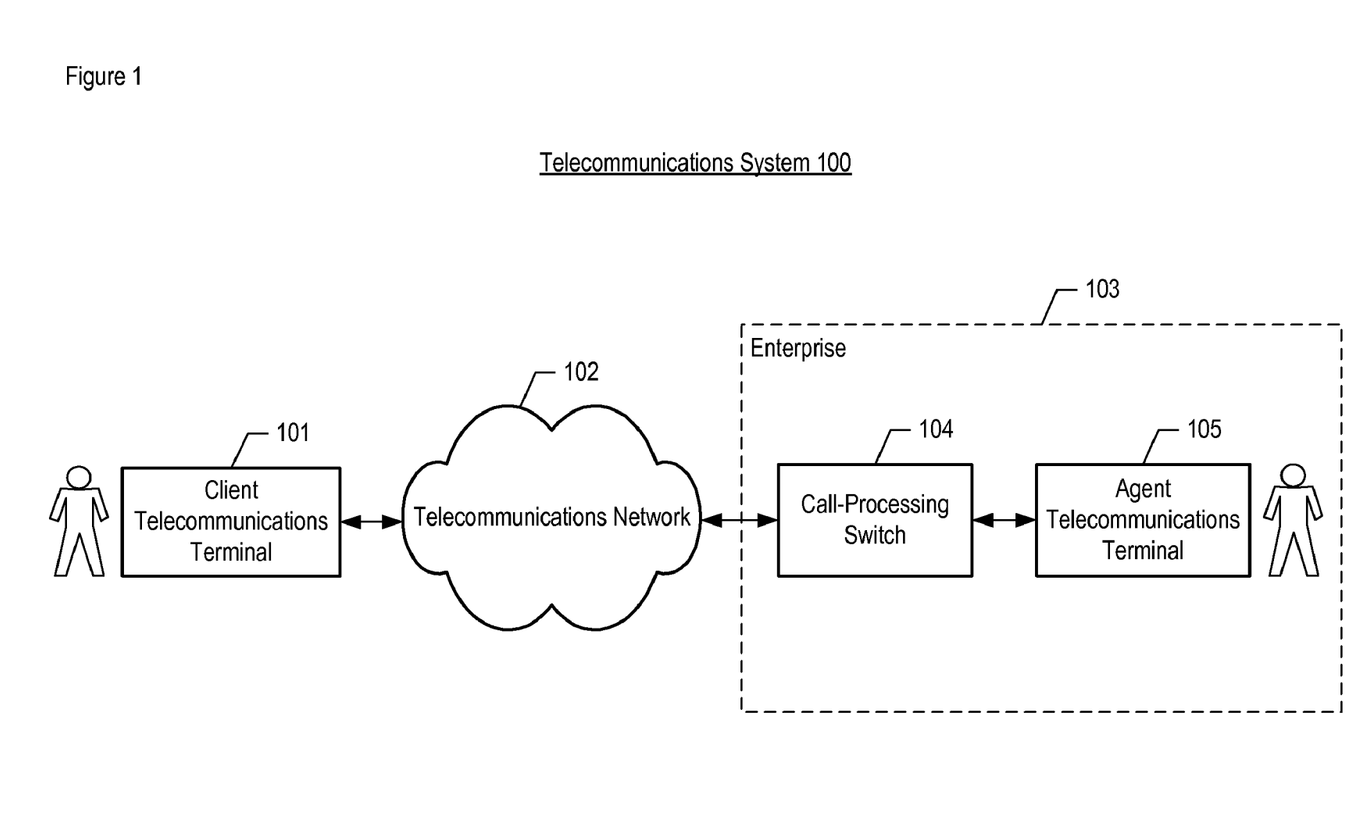
FIG. 1 depicts a schematic diagram of the salient components of telecommunications systems 100 in accordance with the illustrative embodiment of the present invention.

FIG. 1 depicts a schematic diagram of the salient components of telecommunications systems 100 in accordance with the illustrative embodiment of the present invention. Telecommunications system 100 comprises: client telecommunications terminal 101, telecommunications network 102, and enterprise 103, which comprises call-processing switch 104, and agent telecommunications terminal 105.

Although the illustrative embodiment comprises one client terminal, it will be clear to those skilled in the art, after reading this disclosure, how to make and use alternative embodiments of the present invention that comprise any number of client terminals.

Although the illustrative embodiment comprises one telecommunications network, it will be clear to those skilled in the art, after reading this disclosure, how to make and use alternative embodiments of the present invention that comprises any number or any combination of telecommunications networks.

Although the illustrative embodiment comprises one enterprise, it will be clear to those skilled in the art, after reading this disclosure, how to make and use alternative embodiments of the present invention that comprises any number of enterprises.

Although the illustrative embodiment comprises one call-processing switch, it will be clear to those skilled in the art, after reading this disclosure, how to make and use alternative embodiments of the present invention that comprises any number or any combination of call-processing switches.

Although the illustrative embodiment comprises one agent terminal, it will be clear to those skilled in the art, after reading this disclosure, how to make and use alternative embodiments of the present invention that comprises any number of agent terminals.

Caller terminal 101 comprises hardware and software that enables a user to contact and interact with enterprise 103 via sounds. In accordance with the illustrative embodiment, client terminal 101 is a wireless terminal (e.g., a cell phone, a personal digital assistant, a smart-phone, etc.), but it will be clear to those skilled in the art, after reading this disclosure, how to make and use alternative embodiments of the present invention in which some or all of the client terminals connect to telecommunications network 102 via wireline. In any case, it will be clear to those skilled in the art how to make and use client terminal 101.

Telecommunications network 102 is the Public Switched Telephone Network (PSTN), but it will be clear to those skilled in the art, after reading this disclosure, how to make and use alternative embodiments of the present invention in which telecommunications network 102 is a different network or a combination of different networks, for example, and without limitation, the Internet, a private data network, a satellite network, etc.

Enterprise 103 is a building for housing call-processing switch 104, agent terminal 105 and an agent associated with agent terminal 105. In accordance with the illustrative embodiment, agent terminal 105 and the agent are co-located with call-processing switch 104 in enterprise 103, but it will be clear to those skilled in the art, after reading this disclosure, how to make and use alternative embodiments of the present invention in which some or all of the agent terminals and agents are not co-located with call-processing switch 104.

Call-processing switch 104 comprises hardware and software that enables it to store sounds, authenticate a client, retrieve and transmit information requested by the client, connect the client to an agent, etc. In particular, call-processing switch 104 is capable of performing the tasks described below and in the accompanying figures.

Agent terminal 105 comprises hardware and software that enables an agent to interact with client terminal 101, in well-known fashion.

Figure 2:
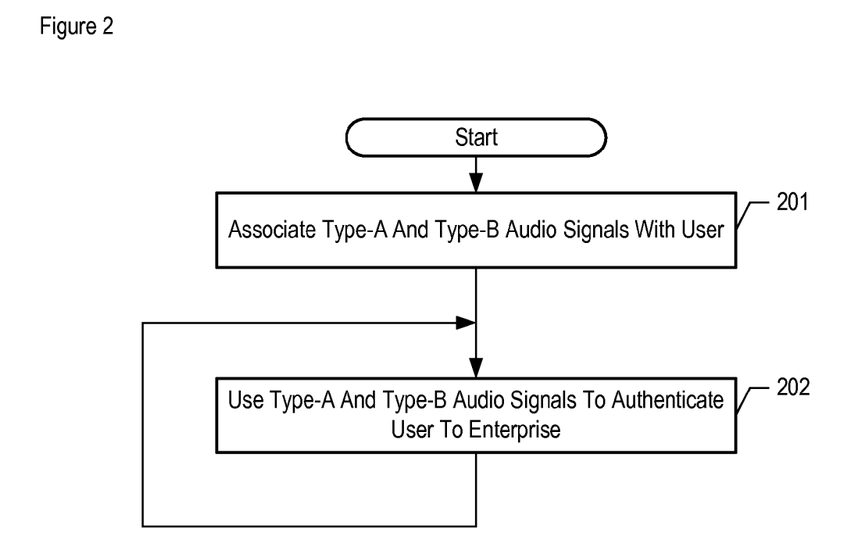
FIG. 2 depicts a flowchart of the salient tasks associated with the operation of the illustrative embodiment of the present invention.

FIG. 2 depicts a flowchart of the salient tasks associated with the operation of the illustrative embodiment of the present invention.

At task 201, the user of client terminal 101 contacts enterprise 103 and registers with call-processing switch 104. As part of task 201, the user and enterprise 103 agree upon:
  i. a user-identifier, and
  ii. a non-empty set of "type-A" sounds that are associated with the user-identifier, and
  iii. a non-empty set of "type-B" sounds that are associated with the user-identifier.
In accordance with the illustrative embodiment, sounds are designated as one of two types, but it will be clear to those skilled in the art, after reading this disclosure, how to make and use alternative embodiments of the present invention in which the sounds are designated as:
  i. any one of M types (e.g., type-A, type-B, type-C, etc.), wherein M is a positive integer greater than 1 (e.g., 2, 3, 4, 5, 6, etc.), or
  ii. any N of M types (e.g., Sound #1 is type-A and type-B, Sound #2 is both type-A and type-C, Sound #3 is type-C, Sound #4 is type-B and type-C and type-D, etc.), wherein N is a positive integer greater than 1 (e.g., 2, 3, 4, 5, 6, etc.) and N<M, or
  iii. any combination of i and ii.
Task 201 is described in detail below and with respect to FIG. 3.

At task 202, enterprise 103 uses the type-A and type-B sounds to authenticate the user. Task 202 is described in detail below and with respect to FIG. 6.

Figure 3:
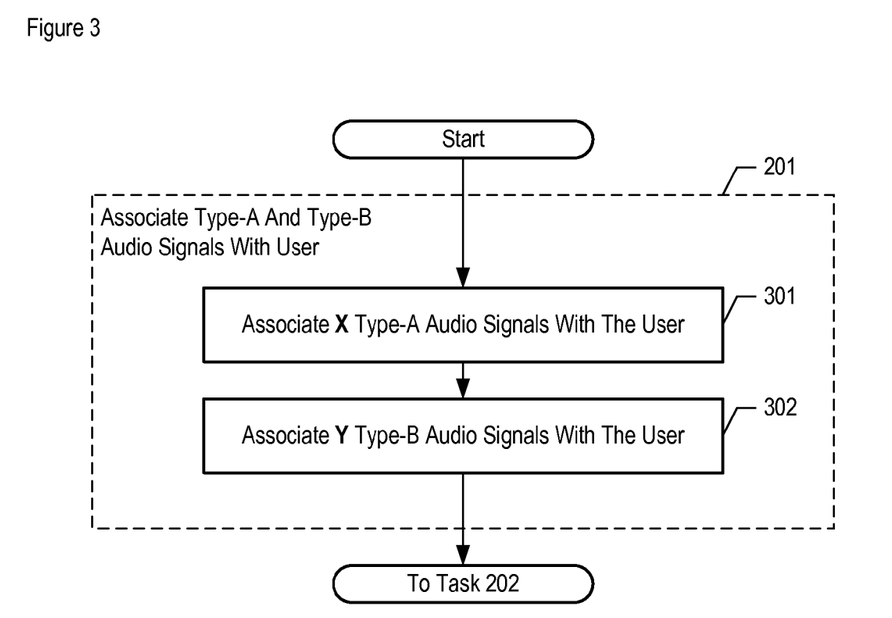
FIG. 3 depicts a flowchart of the salient tasks associated with the operation of task 201 in accordance with the illustrative embodiment of the present invention.

FIG. 3 depicts a flowchart of the salient tasks associated with the operation of task 201.

It will be clear to those skilled in the art, after reading this disclosure, how to make and use alternative embodiments of the present invention in which tasks 301 and 302 are performed in a different order or are performed concurrently. Furthermore, it will be clear to those skilled in the art, after reading this disclosure, how to make and use alternative embodiments of the present invention that omit task 302.

At task 301, the user records and designates a plurality of sounds that are designated as "type-A," and call-processing switch 104 associates them with the user-identifier. Task 301 is described in detail below and in the figures.

At task 302, the user records and designates a plurality of sounds that are designated as "type-B," and call-processing switch 104 associates them with the user-identifier. Task 302 is described in detail below and in the figures. In embodiments where task 302 is omitted, enterprise 103 designates a plurality of sounds as "type-B"—unilaterally and without input from the user—at any time up to, and including, at task 602 as described below.

Figure 4:
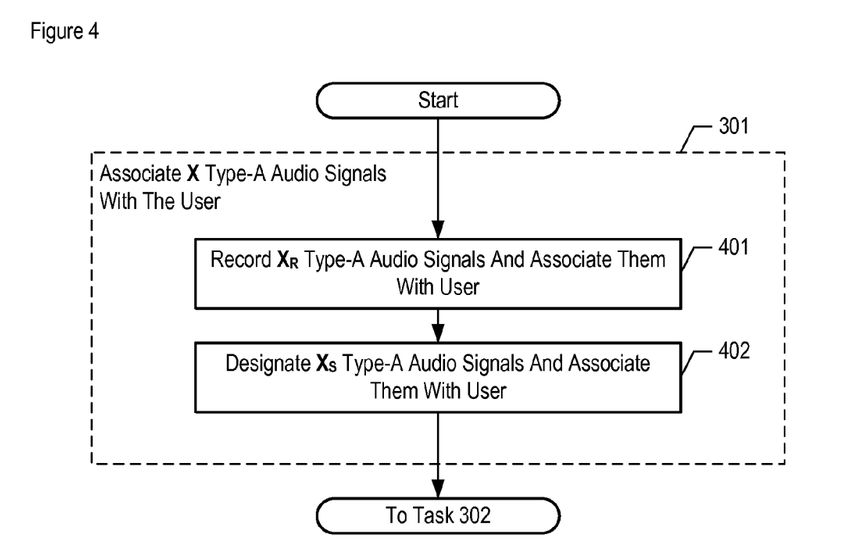
FIG. 4 depicts a flowchart of the salient tasks associated with the operation of task 301 in accordance with the illustrative embodiment of the present invention.

FIG. 4 depicts a flowchart of the salient tasks associated with the operation of task 301 in accordance with the illustrative embodiment.

It will be clear to those skilled in the art, after reading this disclosure, how to make and use alternative embodiments of the present invention in which tasks 401 and 402 are performed in a different order or are performed concurrently. Furthermore, it will be clear to those skilled in the art, after reading this disclosure, how to make and use alternative embodiments of the present invention that omit exactly one of tasks 401 and 402.

At task 401, call-processing switch 104 records $X_R$ type-A sounds, wherein $X_R$ is a positive integer. In accordance with the illustrative embodiment, $X_R=10$, but it will be clear to those skilled in the art, after reading this disclosure, how to make and use alternative embodiments of the present invention in which $X_R$ is any positive integer.

As part of task 401, call-processing switch 104 directs the user to produce or provide $X_R$ sounds, one at a time, to constitute the $X_R$ type-A signals. Once this is done, call-processing switch 104 associates the $X_R$ type-A signals with the user-identifier.

In accordance with the illustrative embodiment, each sound produced by the user is a word spoken by the user, but it will be clear to those skilled in the art, after reading this disclosure, how to make and use alternative embodiments of the present invention in which a sound is:
  i. a spoken word, or
  ii. music, or
  iii. noise, or
  iv. any combination of i, ii, and iii.

At task 402, call-processing switch 104 directs the user to designate $X_S$ sounds from a plurality of sounds presented to the user as "type-A," wherein $X_S$ is a positive integer. Once the user has designated the sounds, call-processing switch 104 associates them with the user's identifier. In accordance with the illustrative embodiment, $X_S=10$, but it will be clear to those skilled in the art, after reading this disclosure, how to make and use alternative embodiments of the present invention in which $X_S$ is any positive integer.

Figure 5:
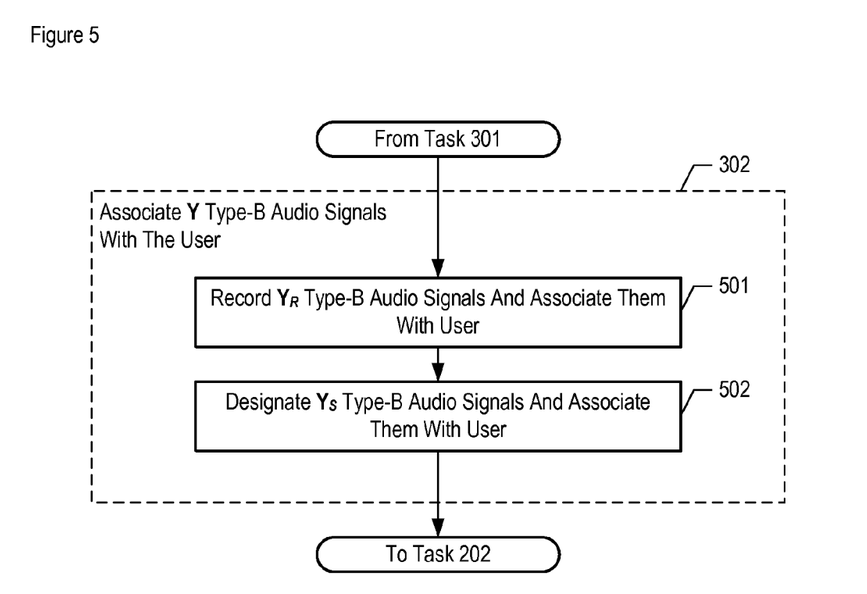
FIG. 5 depicts a flowchart of the salient task associated with the operation of task 302 in accordance with the illustrative embodiment of the present invention.

FIG. 5 depicts a flowchart of the salient tasks associated with the operation of task 302 in accordance with the illustrative embodiment.

It will be clear to those skilled in the art, after reading this disclosure, how to make and use alternative embodiments of the present invention in which tasks 501 and 502 are performed in a different order or are performed concurrently. Furthermore, it will be clear to those skilled in the art, after reading this disclosure, how to make and use alternative embodiments of the present invention in which either task 501 is omitted or task 502 is omitted or both tasks 501 and 502 are omitted.

At task 501, call-processing switch 104 records $Y_R$ type-B sounds, wherein $Y_R$ is a positive integer. In accordance with the illustrative embodiment, $Y_R$=10, but it will be clear to those skilled in the art, after reading this disclosure, how to make and use alternative embodiments of the present invention in which $Y_R$ is any positive integer.

As part of task 501, call-processing switch 104 directs the user to produce or provide $Y_R$ sounds, one at a time, to constitute the $Y_R$ type-B signals. Once this is done, call-processing switch 104 associates the $Y_R$ type-B signals with the user-identifier.

In accordance with the illustrative embodiment, each sound produced by the user is a word spoken by the user, but it will be clear to those skilled in the art, after reading this disclosure, how to make and use alternative embodiments of the present invention in which a sound is:

i. a spoken word, or
  ii. music, or
  iii. noise, or
  iv. any combination of i, ii, and iii.

At task 502, call-processing switch 104 directs the user to designate $Y_S$ sounds from a plurality of sounds presented to the user as "type-B," wherein $Y_S$ is a positive integer. Once the user has designated the sounds, call-processing switch 104 associates them with the user's identifier. In accordance with the illustrative embodiment, $Y_S$=10, but it will be clear to those skilled in the art, after reading this disclosure, how to make and use alternative embodiments of the present invention in which $Y_S$ is any positive integer.

Figure 6:
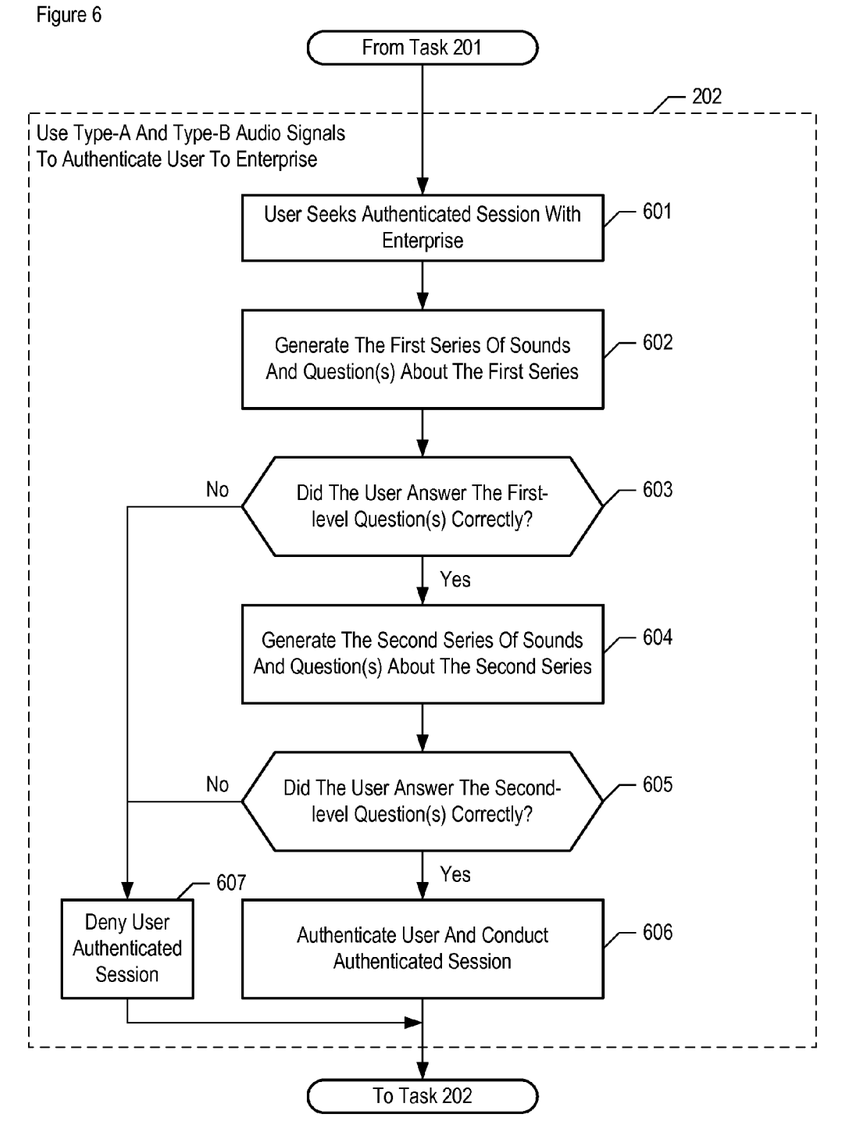
FIG. 6 depicts a flowchart of the salient task associated with the operation of task 202 in accordance with the illustrative embodiment of the present invention.

FIG. 6 depicts a flowchart of the salient tasks associated with the operation of task 202. It will be clear to those skilled in the art, after reading this disclosure, how to make and use alternative embodiments of the present invention in which some or all of the tasks associated with task 202 are performed in a different order than represented or in which some or all of the tasks are performed concurrently. Furthermore, it will be clear to those skilled in the art, after reading this disclosure, how to make and use alternative embodiments of the present invention that omit one or more of the tasks associated with task 202.

At task 601, the user seeks to authenticate himself or herself to enterprise 103 and provides his or her user-identifier to via client terminal 101.

At task 602, call-processing switch 104 transmits a first temporal series of type-A and type-B sounds and two questions about the series of sounds to the user. It will be clear to those skilled in the art, after reading this disclosure, how to make and use alternative embodiments of the present invention in which any number of questions is asked about a series of sounds. Task 602 is described in detail below and with respect to FIG. 7.

At task 603, call-processing switch 104 receives the user's answers to the two questions and determines whether the user answered them correctly. When the user answers the questions correctly, then control moves to a second level of authentication; otherwise, the user's attempt at authentication fails and task 202 ends.

At task 604, call-processing switch 104 transmits a second temporal series of type-A and type-B sounds and two questions about the series of sounds to the user. Task 604 is described in detail below and with respect to FIG. 9.

At task 605, call-processing switch 104 receives the user's answers to the two questions and determines whether the user answered them correctly. When the user answers the questions correctly, then call-processing switch 104 deems the authentication successful; otherwise, the user's attempt at authentication fails and task 202 ends.

Although the illustrative embodiment comprises two levels of authentication, it will be clear to those skilled in the art, after reading this disclosure, how to make and use alternative embodiments of the present invention that comprise any number of levels of authentication.

Figure 7:
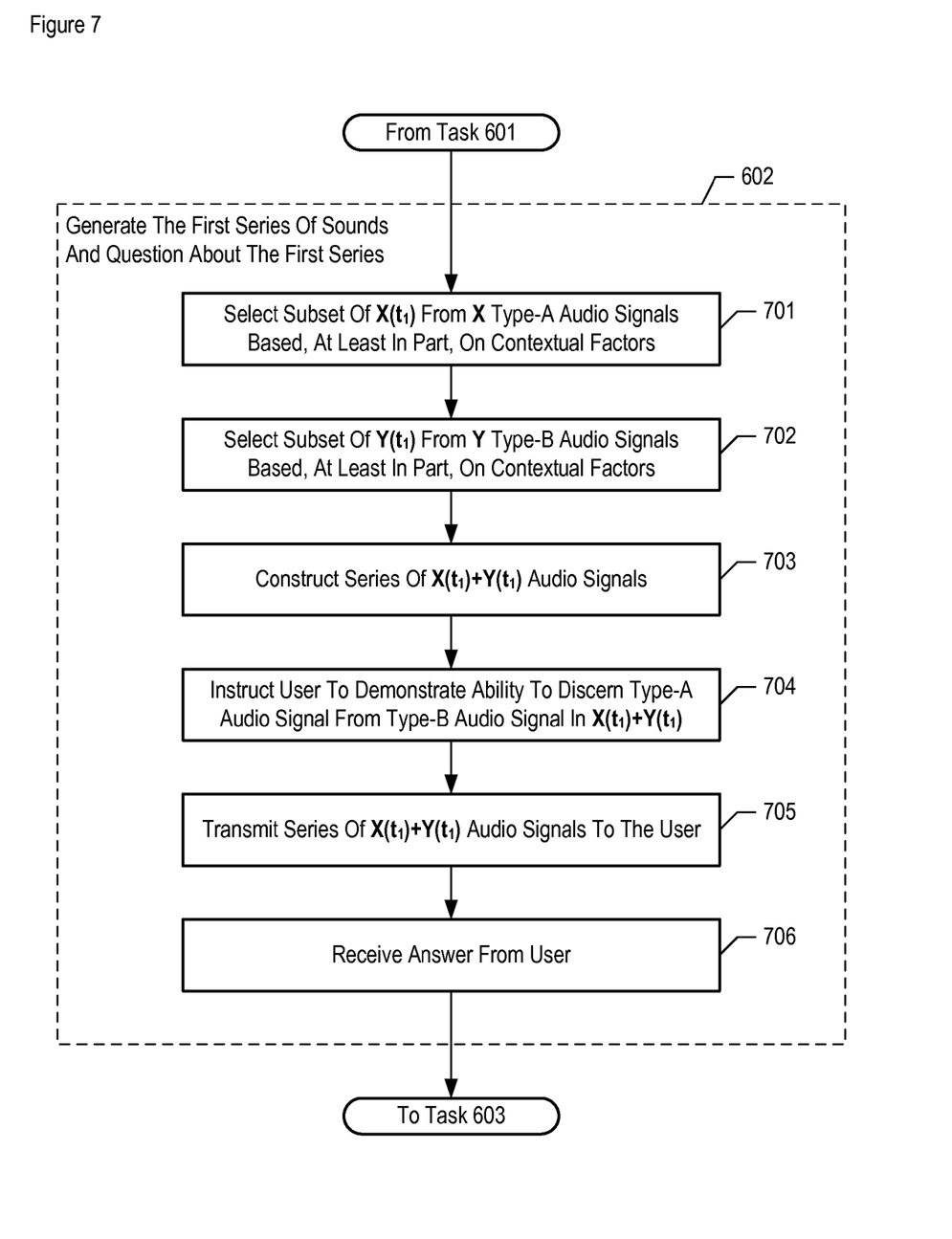
FIG. 7 depicts a flowchart of the salient task associated with the operation of task 602 in accordance with the illustrative embodiment of the present invention.

FIG. 7 depicts a flowchart of the salient task associated with the operation of task 602 in accordance with the illustrative embodiment of the present invention. It will be clear to those skilled in the art, after reading this disclosure, how to make and use alternative embodiments of the present invention in which some or all of the tasks associated with task 602 are performed in a different order than represented or in which some or all of the tasks are performed concurrently. Furthermore, it will be clear to those skilled in the art, after reading this disclosure, how to make and use alternative embodiments of the present invention that omit one or more of the tasks associated with task 602.

At task 701, call-processing switch 104 randomly chooses $X(t_1)$ type-A sounds from the set of $X_R+X_S$ type-A sounds, based on a contextual factor, where $X(t_1)$ is a positive integer equal to 5. It will be clear to those skilled in the art, after reading this disclosure, how to make and use alternative embodiments of the present invention in which $X(t_1)$ has any value.

In accordance with the illustrative embodiment, the contextual factor is the calendrical time, but it will be clear to those skilled in the art, after reading this disclosure, how to make and use alternative embodiments of the present invention in which the contextual factor is:

i. the calendrical time (e.g., time of day, day of week, day or month, month of year, holiday, etc.), or
  ii. an environmental factor (e.g., the weather, when it's daylight, etc.)
  iii. a state in an Interactive Voice Response (IVR) menu, or
  iv. a trait of the client terminal used by the user, or
  v. the geographic location of client terminal 101, or
  vi. any combination of i, ii, iii, iv, and v.

At task 702, call-processing switch 104 randomly chooses $Y(t_1)$ type-B sounds from the set of $Y_R+Y_S$ type-B sounds, based on a contextual factor, where $Y(t_1)$ is a positive integer equal to 5. It will be clear to those skilled in the art, after reading this disclosure, how to make and use alternative embodiments of the present invention in which $Y(t_1)$ has any value.

In accordance with the illustrative embodiment, the contextual factor is the calendrical time, but it will be clear to those skilled in the art, after reading this disclosure, how to make and use alternative embodiments of the present invention in which the contextual factor is:

i. the calendrical time (e.g., time of day, day of week, day or month, month of year, holiday, etc.), or
  ii. an environmental factor (e.g., the weather, when it's daylight, etc.)
  iii. a state in an Interactive Voice Response (IVR) menu, or
  iv. a trait of the client terminal used by the user, or
  v. the geographic location of client terminal 101, or
  vi. any combination of i, ii, iii, iv, and v.

At task 703, call-processing switch 104 arranges the $X(t_1)$ type-A sounds and the $Y(t_1)$ type-B in random order into temporal series of $X(t_1)+Y(t_1)$ sounds. Table 1 depicts a illustrative temporal series of $X(t_1)+Y(t_1)$=10 sounds.

TABLE 1

| Order | Sound Type |
|---|---|
| Illustrative Temporal Series of $X(t_1) + Y(t_1) = 10$ Sounds | |
| 1 | A |
| 2 | B |
| 3 | B |
| 4 | A |
| 5 | A |
| 6 | B |
| 7 | B |
| 8 | A |
| 9 | B |
| 10 | A |

At task 704, call-processing switch 104 constructs $Q_1$ questions about the series of $X(t_1)+Y(t_1)$ sounds, where $Q_1$ is a positive integer. In accordance with the illustrative embodiment, $Q_1=3$, but it will be clear to those skilled in the art, after reading this disclosure, how to make and use alternative embodiments of the present invention in which $Q_1$ has any value (e.g., 1, 2, 3, 4, 5, 6, 7, etc.).

In accordance with the illustrative embodiment, the $Q_1$ questions require the user to demonstrate the ability to distinguish a type-A sound from a type-B sound in the $X(t_1)+Y(t_1)$ sounds by:
  i. counting the number of type-A sounds in the series, or
  ii. counting the number of type-B sounds in the series, or
  iii. determining whether the series comprises one or more sequences of type-A and type-B sounds, or
  iv. identifying one or more type-A sounds in the series, or
  v. identifying one or more type-B sounds in the series, or
  vi. any combination of i, ii, iii, iv, and v.

In accordance with the illustrative embodiment, the $Q_1=3$ questions are:
  (1) Does the series of sounds contain 5 type-A sounds?" (Answer: Yes)
  (2) Does the series of sounds contain three type-B sounds in succession? (Answer: No)
  (3) Are there more than 2, but less than 5 type-B sounds? (Answer: No)

It will be clear to those skilled in the art, after reading this disclosure, how to make and use alternative embodiments of the present invention that use any questions that user demonstrates an ability to distinguish a type-A sound from a type-B sound in the $X(t_1)+Y(t_1)$ sounds.

At task 705, call-processing switch 104 transmits the series of $X(t_1)+Y(t_1)$ sounds and the $Q_1$ questions to the user via to client terminal 101.

At task 706, call-processing switch 104 receives the user's $Q_1$ answers and determines whether the answers are correct.

Figure 8:
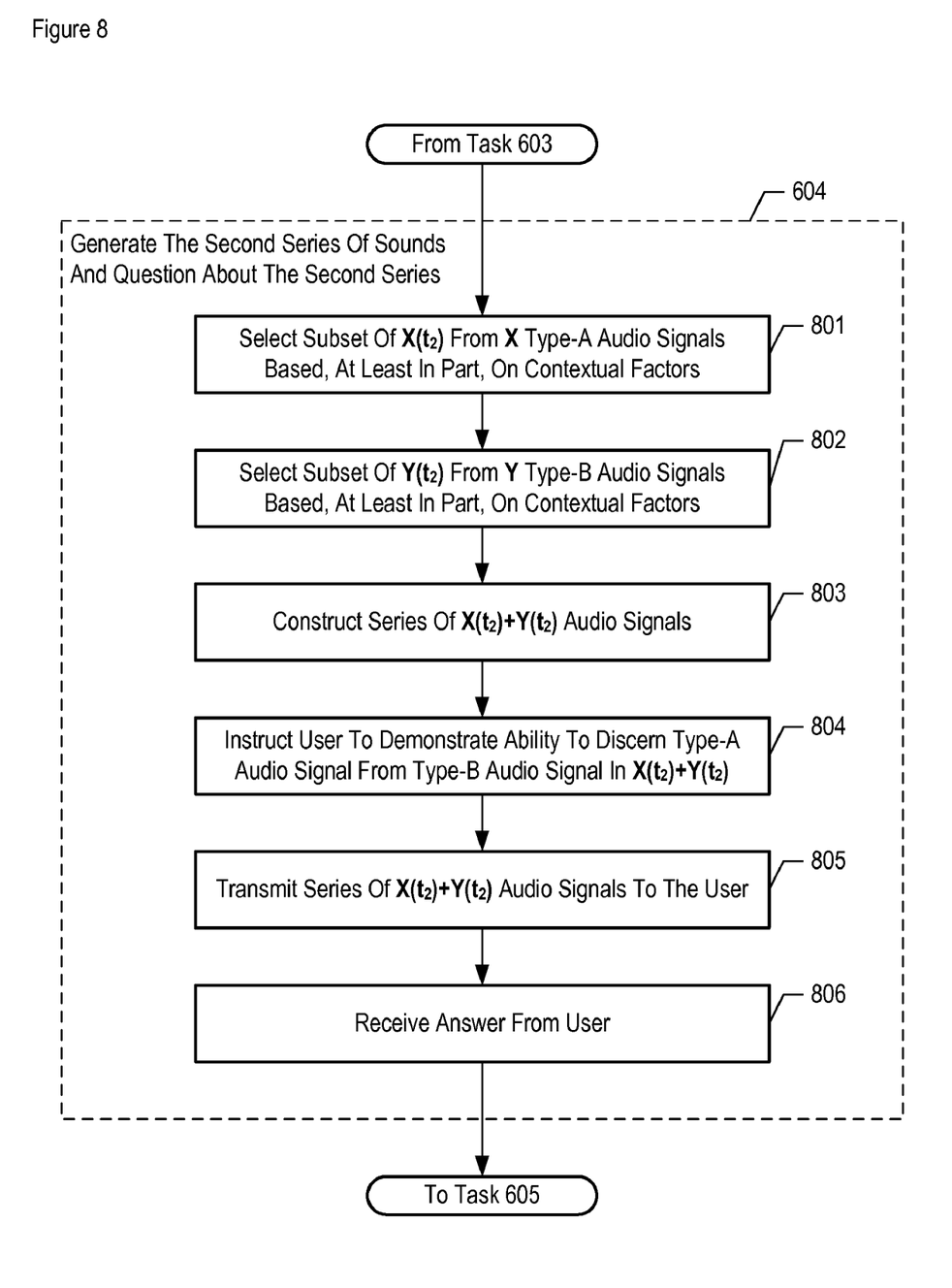
FIG. 8 depicts a flowchart of the salient task associated with the operation of task 604 in accordance with the illustrative embodiment of the present invention.

FIG. 8 depicts a flowchart of the salient task associated with the operation of task 604 in accordance with the illustrative embodiment of the present invention. It will be clear to those skilled in the art, after reading this disclosure, how to make and use alternative embodiments of the present invention in which some or all of the tasks associated with task 604 are performed in a different order than represented or in which some or all of the tasks are performed concurrently. Furthermore, it will be clear to those skilled in the art, after reading this disclosure, how to make and use alternative embodiments of the present invention that omit one or more of the tasks associated with task 604.

At task 801, call-processing switch 104 randomly chooses $X(t_2)$ type-A sounds from the set of $X_R+X_S$ type-A sounds, based on a contextual factor, where $X(t_2)$ is a positive integer equal to 4. It will be clear to those skilled in the art, after reading this disclosure, how to make and use alternative embodiments of the present invention in which $X(t_2)$ has any value.

In accordance with the illustrative embodiment, the contextual factor is the calendrical time, but it will be clear to those skilled in the art, after reading this disclosure, how to make and use alternative embodiments of the present invention in which the contextual factor is:
  i. the calendrical time (e.g., time of day, day of week, day or month, month of year, holiday, etc.), or
  ii. an environmental factor (e.g., the weather, when it's daylight, etc.)
  iii. a state in an Interactive Voice Response (IVR) menu, or
  iv. a trait of the client terminal used by the user, or
  v. the geographic location of client terminal 101, or
  vi. any combination of i, ii, iii, iv, and v.

At task 802, call-processing switch 104 randomly chooses $Y(t_2)$ type-B sounds from the set of $Y_R+Y_S$ type-B sounds, based on a contextual factor, where $Y(t_2)$ is a positive integer equal to 7. It will be clear to those skilled in the art, after reading this disclosure, how to make and use alternative embodiments of the present invention in which $Y(t_2)$ has any value.

In accordance with the illustrative embodiment, the contextual factor is the calendrical time, but it will be clear to those skilled in the art, after reading this disclosure, how to make and use alternative embodiments of the present invention in which the contextual factor is:
  i. the calendrical time (e.g., time of day, day of week, day or month, month of year, holiday, etc.), or
  ii. an environmental factor (e.g., the weather, when it's daylight, etc.)
  iii. a state in an Interactive Voice Response (IVR) menu, or
  iv. a trait of the client terminal used by the user, or
  v. the geographic location of client terminal 101, or
  vi. any combination of i, ii, iii, iv, and v.

At task 803, call-processing switch 104 arranges the $X(t_2)$ type-A sounds and the $Y(t_2)$ type-B in random order into temporal series of $X(t_2)+Y(t_2)$ sounds. Table 2 depicts a illustrative temporal series of $X(t_2)+Y(t_2)=11$ sounds.

TABLE 2

| Order | Sound Type |
|---|---|
| Illustrative Temporal Series of $X(t_2) + Y(t_2) = 11$ Sounds | |
| 1 | A |
| 2 | B |
| 3 | B |
| 4 | A |
| 5 | B |
| 6 | B |
| 7 | B |
| 8 | A |
| 9 | B |
| 10 | A |
| 11 | B |

At task 804, call-processing switch 104 constructs $Q_2$ questions about the series of $X(t_2)+Y(t_2)$ sounds, where $Q_2$ is a positive integer. In accordance with the illustrative embodiment, $Q_2=1$, but it will be clear to those skilled in the art, after reading this disclosure, how to make and use alternative embodiments of the present invention in which $Q_2$ has any value (e.g., 1, 2, 3, 4, 5, 6, 7, etc.).

In accordance with the illustrative embodiment, the $Q_2$ questions require the user demonstrates an ability to distinguish a type-A sound from a type-B sound in the $X(t_2)+Y(t_2)$ sounds by:
  i. counting the number of type-A sounds in the series, or
  ii. counting the number of type-B sounds in the series, or
  iii. determining whether the series comprises one or more sequences of type-A and type-B sounds, or
  iv. identifying one or more type-A sounds in the series, or
  v. identifying one or more type-B sounds in the series, or
  vi. any combination of i, ii, iii, iv, and v.

In accordance with the illustrative embodiment, the $Q_2=3$ questions are:
  (1) Does the series of sounds contain 6 type-A sounds?" (Answer: No)
  (2) Does the series of sounds contain three type-B sounds in succession? (Answer: Yes)

It will be clear to those skilled in the art, after reading this disclosure, how to make and use alternative embodiments of the present invention that use any questions that user demonstrates an ability to distinguish a type-A sound from a type-B sound in the $X(t_2)+Y(t_2)$ sounds.

At task 805, call-processing switch 104 transmits the series of $X(t_2)+Y(t_2)$ sounds and the $Q_2$ questions to the user via to client terminal 101.

At task 806, call-processing switch 104 receives the user's $Q_2$ answers and determines whether the answers are correct.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   transmitting a series of $X(t_1)+Y(t_1)$ sounds to a user, wherein the series of $X(t_1)+Y(t_1)$ sounds comprises $X(t_1)$ type-A sounds and $Y(t_1)$ type-B sounds; and
   authenticating the user when and only when the user demonstrates an ability to distinguish a type-A sound from a type-B sound in the $X(t_1)+Y(t_1)$ sounds;
   wherein $X(t_1)$ and $Y(t_1)$ are positive integers.

2. The method of claim 1 wherein authenticating the user comprises authenticating the user when and only when the user identifies one or more type-A sounds in the series of $X(t_1)+Y(t_1)$ sounds.

3. The method of claim 1 wherein authenticating the user comprises authenticating the user when and only when the user identifies one or more type-B sounds in the series of $X(t_1)+Y(t_1)$ sounds.

4. The method of claim 1 wherein authenticating the user comprises authenticating the user when and only when the user can count the number of type-A sounds in the series of $X(t_1)+Y(t_1)$ sounds.

5. The method of claim 1 wherein authenticating the user comprises authenticating the user when and only when the user can count the number of type-B sounds in the series of $X(t_1)+Y(t_1)$ sounds.

6. The method of claim 1 wherein authenticating the user comprises authenticating the user when and only when the user identifies the series of $X(t_1)+Y(t_1)$ sounds as comprising a correct sequence of type-A and type-B sounds.

7. The method of claim 1 wherein at least one of the $X(t_1)+Y(t_1)$ sounds is selected based on a contextual factor.

8. A method comprising:
   transmitting a series of $X(t_1)+Y(t_1)$ and a series of $X(t_2)+Y(t_2)$ sounds to a user, wherein the series of $X(t_1)+Y(t_1)$ sounds comprises $X(t_1)$ type-A sounds and $Y(t_1)$ type-B sounds, and wherein the series of $X(t_2)+Y(t_2)$ sounds comprises $X(t_2)$ type-A sounds and $Y(t_2)$ type-B sounds; and
   authenticating the user when and only when the user demonstrates an ability to:
     (i) distinguish a type A sound from a type-B sound in the series of $X(t_1)+Y(t_1)$ sounds, and
     (ii) distinguish a type-A sound from a type-B sound in the series of $X(t_2)+Y(t_2)$ sounds;
   wherein $X(t_1)$, $X(t_2)$, $Y(t_1)$ and $Y(t_2)$ are positive integers; and
   wherein the series of $X(t_1)+Y(t_1)$ is different from series of $X(t_2)+Y(t_2)$ sounds.

9. The method of claim 8 wherein authenticating the user comprises authenticating the user when and only when the user identifies one or more type-A sounds in the series of $X(t_1)+Y(t_1)$ sounds.

10. The method of claim 8 wherein authenticating the user comprises authenticating the user when and only when the user identifies one or more type-B sounds in the series of $X(t_1)+Y(t_1)$ sounds.

11. The method of claim 8 wherein authenticating the user comprises authenticating the user when and only when the user can count the number of type-A sounds in the series of $X(t_1)+Y(t_1)$ sounds.

12. The method of claim 8 wherein authenticating the user comprises authenticating the user when and only when the user can count the number of type-B sounds in the series of $X(t_1)+Y(t_1)$ sounds.

13. The method of claim 8 wherein authenticating the user comprises authenticating the user when and only when the user identifies the series of $X(t_1)+Y(t_1)$ sounds as comprising a correct sequence of type-A and type-B sounds.

14. The method of claim 8 wherein at least one of the $X(t_1)+Y(t_1)$ sounds is selected based on a contextual factor.

* * * * *